United States Patent [19]
Brown

[11] Patent Number: 6,032,240
[45] Date of Patent: Feb. 29, 2000

[54] BYPASSING A NONPAGED POOL CONTROLLER WHEN ACCESSING A REMAINDER PORTION OF A RANDOM ACCESS MEMORY

[75] Inventor: David Ashley Brown, Georgetown, Ky.

[73] Assignee: Intergraph Corporation, Huntsville, Ala.

[21] Appl. No.: 09/178,870

[22] Filed: Oct. 26, 1998

Related U.S. Application Data

[60] Provisional application No. 60/065,218, Nov. 12, 1997.

[51] Int. Cl.[7] .............................. G06F 9/46; G06F 12/08
[52] U.S. Cl. ......................... 711/173; 711/103; 711/104
[58] Field of Search .................................. 711/173, 104, 711/103

[56] References Cited

U.S. PATENT DOCUMENTS 5,913,230   6/1999   Richardson ............................ 711/173

OTHER PUBLICATIONS

"Dynamic Storage Pool Manager," IBM Technical Disclosure Bulletin, vol. 28, No. 4, Sep. 1985, pp. 1684–1686, New York.

*Primary Examiner*—Reginald G. Bragdon
*Attorney, Agent, or Firm*—Bromberg & Sunstein LLP

[57] ABSTRACT

A method, apparatus, and computer program product for accessing random access memory (RAM) in a computer system running a virtual memory operating system designates a part of the RAM as system memory for use by the operating system. This memory designation consequently produces a remainder memory in the RAM. The remainder memory may be directly accessed by a virtual memory manager upon receipt of an access message requesting access to the remainder memory. The virtual memory manager is controlled to bypass its nonpaged pool controller when accessing the remainder memory. Bypassing the nonpaged pool controller significantly enlarges the available RAM that may be used for temporarily storing data files.

39 Claims, 3 Drawing Sheets

BYPASSING A NONPAGED POOL CONTROLLER WHEN ACCESSING A REMAINDER PORTION OF A RANDOM ACCESS MEMORY

PRIORITY

This application claims priority from provisional application Ser. No. 60/065,218, filed Nov. 12, 1997, entitled "APPARATUS AND METHOD OF ACCESSING RANDOM ACCESS MEMORY" and bearing attorney docket number 1247/173, which is incorporated herein, in its entirety, by reference.

FIELD OF THE INVENTION

This invention relates generally to memory in a computer system and, more particularly, this invention relates to accessing random access memory in a computer system having a virtual memory operating system.

BACKGROUND OF THE INVENTION

Data stored in conventional high-speed random access memory ("RAM") may be accessed much faster (e.g., often about one hundred-thousand times faster) than data stored in conventional non-volatile memory. Accordingly, application program driver software often is configured to temporarily store data files in RAM for subsequent processing by one or more application programs. This use of RAM, which may be utilized as a RAM disk or a disk cache, significantly reduces file access time, thereby reducing the time required for processing the data.

Virtual memory operating systems (described below) often are configured to set aside a small amount of the RAM ("nonpaged pool memory") for temporarily storing data files as described above. The remainder of the RAM consequently is reserved for storing operating system code and executing operating system processes ("operating system RAM"). The nonpaged pool memory typically is much smaller than the operating system RAM, however, and therefore can become a bottleneck in the computer system if it is used to store too much data.

A virtual memory operating system generally is defined as an operating system that automatically pages (i.e., transfers) data between RAM and a hard disk when executing system processes. Paging data to and from the hard disk conserves space in the RAM, thus enabling the system to function as if the physical RAM were significantly larger than its actual size. The RAM in a computer system running a virtual memory operating system can be accessed only by a virtual memory manager module (a part of the operating system) that interfaces the driver software with the RAM. The virtual memory manager includes a nonpaged pool controller for accessing the nonpaged pool memory when a message is received from a driver requesting access to a file (or data) in the nonpaged pool.

One known virtual memory operating system, for example, is the Microsoft Windows NT™ operating system, Version 4.0 ("Microsoft Windows NT™"), distributed by Microsoft Corp. of Redmond, Wash. The operation of virtual memory operating systems, such as the Microsoft Windows NT™ operating system, is described in more detail in "Inside Windows NT", by Helen Custer, copyright 1993 by Microsoft Press, the disclosure of which is incorporated, in its entirety, by reference. As known in the art, Windows NT™ includes a virtual memory manager like those described above. This virtual memory manager utilizes a plurality of virtual memory manager functions to control access to system RAM.

As noted above, only a limited amount of space in the RAM is allocated to the nonpaged pool memory. For example, the Microsoft NT™ operating system permits a maximum of 192 megabytes of RAM space for the nonpaaged pool memory in a system having a four gigabyte or larger RAM. Accordingly, the operating system in such case reserves the remaining 3,808 megabytes for operating system RAM. Like other virtual memory operating systems, the Microsoft NT™ operating system requires a minimum of only sixteen megabytes of RAM to operate properly. The allocation of 3,808 megabytes for operating system RAM thus is not necessary.

SUMMARY OF THE INVENTION

In accordance with one aspect of the invention, a method, apparatus, and computer program product for accessing random access memory (RAM) in a computer system running a virtual memory operating system designates a part of the RAM as system memory for use by the operating system. This memory designation consequently produces a remainder memory in the RAM. At least part of the remainder memory may be directly accessed by a virtual memory manager upon receipt of an access message requesting access to the remainder memory. The virtual memory manager is controlled to bypass its nonpaged pool controller when accessing the remainder memory. Bypassing the nonpaged pool controller significantly enlarges the amount of to available RAM that may be used for temporarily storing data files.

In accordance with another aspect of the invention, the access message includes the address of a location in the remainder memory that is to be accessed. Files in the remainder memory may be created, read, and/or written to as a result of the access. In preferred embodiments of the invention, the remainder memory is greater than about 192 megabytes.

In accordance with another aspect of the invention that is implemented as a disk cache, a file to be accessed may be stored in either the remainder memory or in a hard disk that is a part of the computer system. It therefore is determined if the file is stored in the remainder memory or in the hard disk. If it is determined that the file is in the remainder memory, the virtual memory manager directly accesses the remainder memory to access the file. If it is determined that the file is in the hard disk, then the file is retrieved from the hard disk and stored in the remainder memory for subsequent processing.

BRIEF DESCRIPTION OF THE DRAWINGS

The foregoing and other objects and advantages of the invention will be appreciated more fully from the following further description thereof with reference to the accompanying drawings wherein.

DESCRIPTION OF PREFERRED EMBODIMENTS

Figure 1:
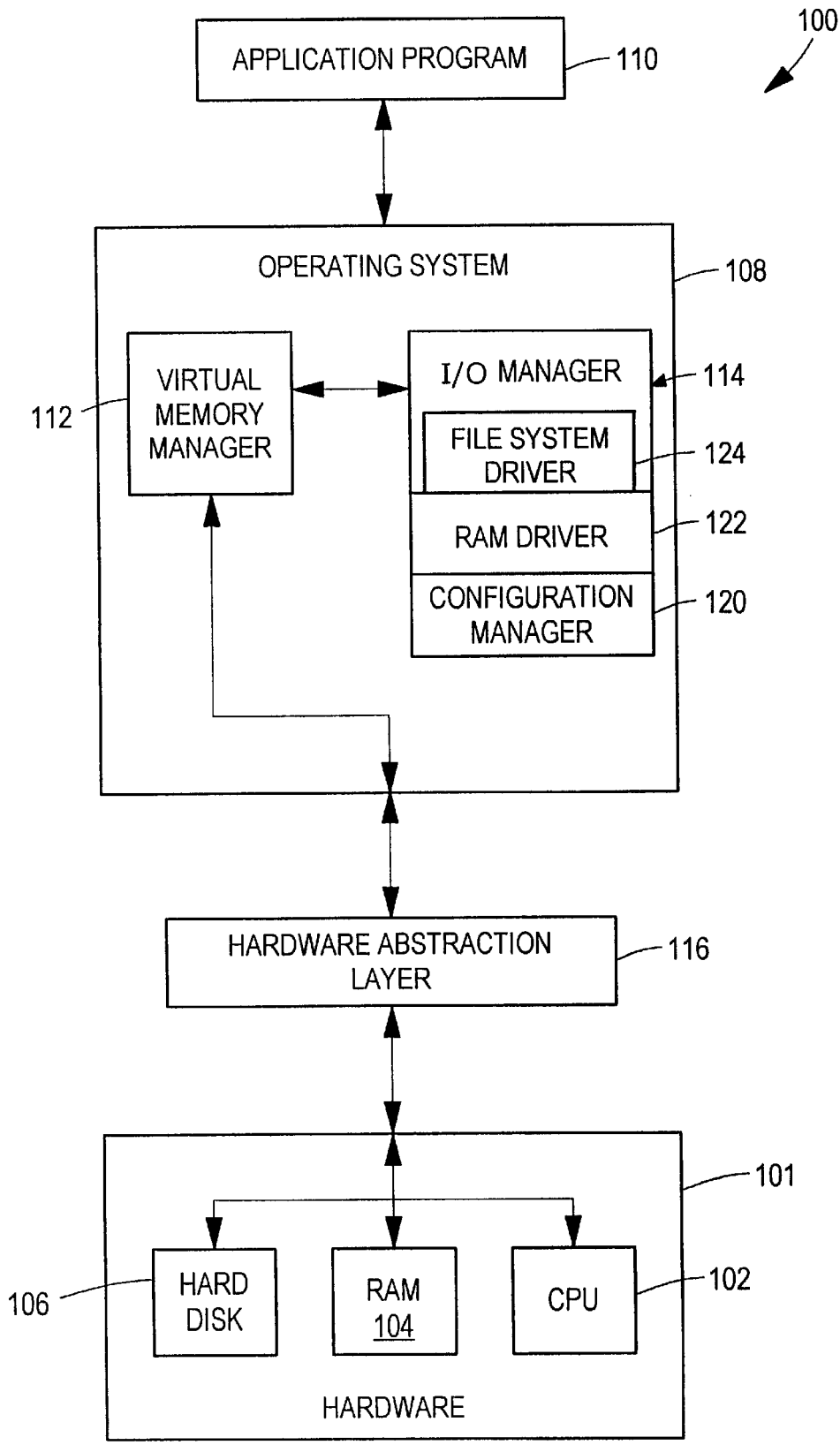
FIG. 1 schematically shows a computer system that may be utilized with a preferred embodiment of the invention.

FIG. 1 schematically shows a computer system 100 that may be utilized with a preferred embodiment of the invention to efficiently utilize random access memory. The system 100 includes hardware 101 comprising, among other things, a central processing unit 102 for processing computer instructions, random access memory ("RAM 104") for high-speed, volatile data storage, and a hard disk 106 for non-volatile data storage. The system 100 also includes a virtual memory operating system 108 for both controlling system processes, and interfacing between an application program 110 and the hardware 101. The operating system 108 includes a virtual memory manager 112 for accessing the RAM 104, and an input/output manager ("I/O manager 114") for controlling input to and output from the system 100. The RAM 104 may be accessed by the virtual memory manager 112 only and thus, is not directly accessible by any other part of the system 100. In a preferred embodiment of the invention, the operating system 108 is the Microsoft Windows NT™ operating system, Version 4.0 ("Microsoft Windows NT™") distributed by Microsoft Corp. Although not necessary in many operating systems, a hardware abstraction layer 116 ("HAL") also may be included in the system 100 to interface the operating system 108 with different hardware architectures. It should be noted that although the invention is described in connection with the Windows NT™ operating system, its principles apply to other virtual memory operation systems.

In accordance with preferred embodiments of the invention, the amount of RAM 104 allocated to operating system processes ("system memory") is limited to a fixed maximum amount, and at least a portion of the remainder of the RAM 104 ("remainder memory") is allocated to storing files or data generated by application programs (e.g., the application program 110) that may utilize the system 100. It is preferred that the remainder memory be significantly larger than the system memory. For example, in a computer system having four gigabytes of RAM 104, the system memory may be about 16 megabytes while the remainder memory may be 3.984 gigabytes. At least a portion of the 3.984 gigabytes are used to store application files or application data.

Files and data stored in the remainder memory, which may be read and modified by the application program 110 during run time, can be any type of file, such as a database file containing many megabytes of data. Since access times to files in the RAM 104 are significantly faster than access times to files in the hard disk 106, processes are completed much more rapidly when files first are moved into the remainder memory from the hard disk 106 prior to their use, and then accessed in the remainder memory when needed. By way of example, access times to RAM commonly are at least about one hundred-thousand times faster than access times to the hard disk 106.

As shown schematically in FIG. 1, the inventive I/O manager 114 includes a configuration manager 120 for configuring the RAM 104, a RAM driver 122 for managing access to the remainder memory, and a file system driver 124 for managing the RAM filing system (described below). The configuration manager 120, which preferably is an application program, configures the RAM 104 prior to installing the RAM driver 122. More particularly, the configuration manager 120 receives configuration information from a user by displaying a form having fields for entering configuration data. The fields may include:

Total RAM in System: the total size of the RAM 104 in the computer system.

Remainder Memory Size: the total size of the remainder memory.

Start Location: the lowest address in the remainder memory. The last address location of the remainder memory will be this address plus the total number of addresses required to include the total remainder memory. All addresses between the start location and the last address therefore will be a part of the remainder memory.

Drive Letter: the drive letter assigned to the remainder memory.

When used with the Microsoft NT™ operating system, the configuration manager 120 modifies the BOOT.INI file to add the well known /MAXMEM=XXX option, where "XXX" is the total amount of system memory as calculated from the information received in the form. Specifically, XXX is the difference between the total amount of RAM in the computer system, and the amount of RAM allocated as remainder memory. As is known by those skilled in the art, the MAXMEM option typically is utilized to test specified amounts of RAM in a computer system. For example, in a three gigabyte system, if the MAXMEM option is set to one gigabyte, then only one (specified) gigabyte of RAM will be used by such system. The remaining two gigabytes thus are not used. This common use of the MAXMEM option enables a section of the RAM to be tested, for example, without physically disconnecting parts of the RAM (e.g., the two gigabytes in the immediately preceding example) from the entire RAM system (e.g., the three gigabytes also in the immediately preceding example).

Accordingly, the portion of the RAM 104 selected by the MAXMEM option is used for the operating system. In fact, even if the nonpaged pool controller were being used to store data files for the application program, such files would be stored in the RAM designated by the MAXMEM option too. Of course, in preferred embodiments, the nonpaged pool controller is bypassed and thus, does not attempt to store data in such designated RAM. Nevertheless, as discussed in greater detail below, the remainder memory (i.e., that portion of the RAM 104 not designated by the MAXMEM option) preferably is utilized to store files and data from the application program 110.

The configuration data entered into the form preferably is stored in the system configuration registry, which contains all of the configuration and set-up data for the operating system 108. Once the registry is updated and the MAXMEM option is set, the RAM driver 122 may be initiated to partition the RAM 104. Once initiated, the RAM driver 122 first checks the MAXMEM option. If it is not set, then the RAM driver 122 may display a message indicating that the configuration data must be entered to implement the remainder memory. System errors can occur if the MAXMEM option is not set since the RAM driver 122 may be attempting to overwrite parts of RAM 104 that are used by the operating system 108. If the MAXMEM option is set, however, then a block of memory space in the RAM 104 may be initialized for use as the remainder memory.

When used with the Microsoft Windows NT™ operating system, for example, a Microsoft Windows NT™ VMM (Virtual Memory Manager) function may be called to initialize the remainder memory. For example, such VMM function may be "MmMapioSpace," having the input parameters, "physical address", "size of file" (i.e., the size of the remainder memory), and "cache." The physical address parameter specifies the starting physical address of the block of memory reserved as the remainder memory, while the size of file parameter specifies the size (in bytes) of the entire remainder memory. The Cache parameter preferably is set to "FALSE", thereby preventing the operating system from caching stored files.

After the remainder memory is initialized, the RAM driver 122 continues to execute and operates as required by the application program 110. Specifically, the RAM driver 122 is used, in conjunction with the file system driver 124 (FIG. 1), to store, read, and write to files in the remainder memory.

Figure 2:
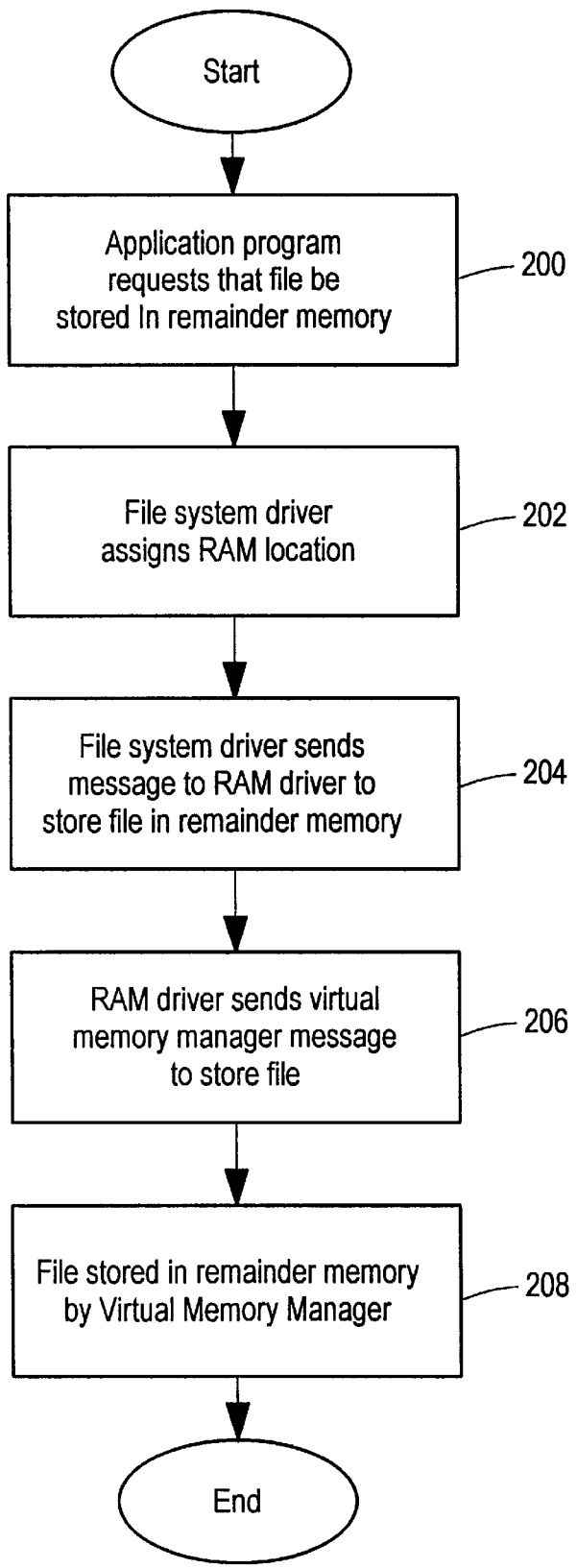
FIG. 2 shows a flow chart summarizing the steps of storing a file in a remainder memory portion of the random access memory in accordance with a preferred embodiment of the invention.

FIG. 2 shows a flow chart summarizing the steps of a preferred embodiment for storing a file in the remainder memory. The process begins at step 200, in which the application program 110 transmits a request message to the I/O manager 114 that a file from the hard disk 106 is to be copied and moved to the remainder memory. The message may include the name of the file and the address of the file in the hard disk 106. The process continues to step 202 in which the file system driver 124 determines the unused addresses in the remainder memory and assigns the file to one of those addresses as a start address. The file system driver 124 then stores, in the RAM 104, the start address of the file in the remainder memory.

The process continues to step 204 in which the file system driver 124 sends a message to the RAM driver 122 to store the file in the remainder memory. This message may include the name of the file, its current location in the hard drive, and the start address assigned to it by the file system driver 124. The RAM driver 122 then sends a message to the Virtual Memory Manager ("VMM 112") to store the file in the remainder memory in the appropriate address locations (step 206). This message may include the information in the message received from the file system driver 124. In response, the VMM 112 first retrieves the file from the hard drive, and then stores the file in the designated location in the remainder memory (step 208). Both the retrieval and storage of the file are executed via a VMM function.

Accordingly, the nonpaged pool memory controller is bypassed and thus, not utilized to store the file. If the nonpaged pool memory controller were used, then the file would be limited to being stored in the nonpaged pool memory. Instead of limiting RAM 104 access to the nonpaged pool memory in the RAM 104, however, this direct memory access enables at least a portion of the remainder memory to be used to store files.

Figure 3:
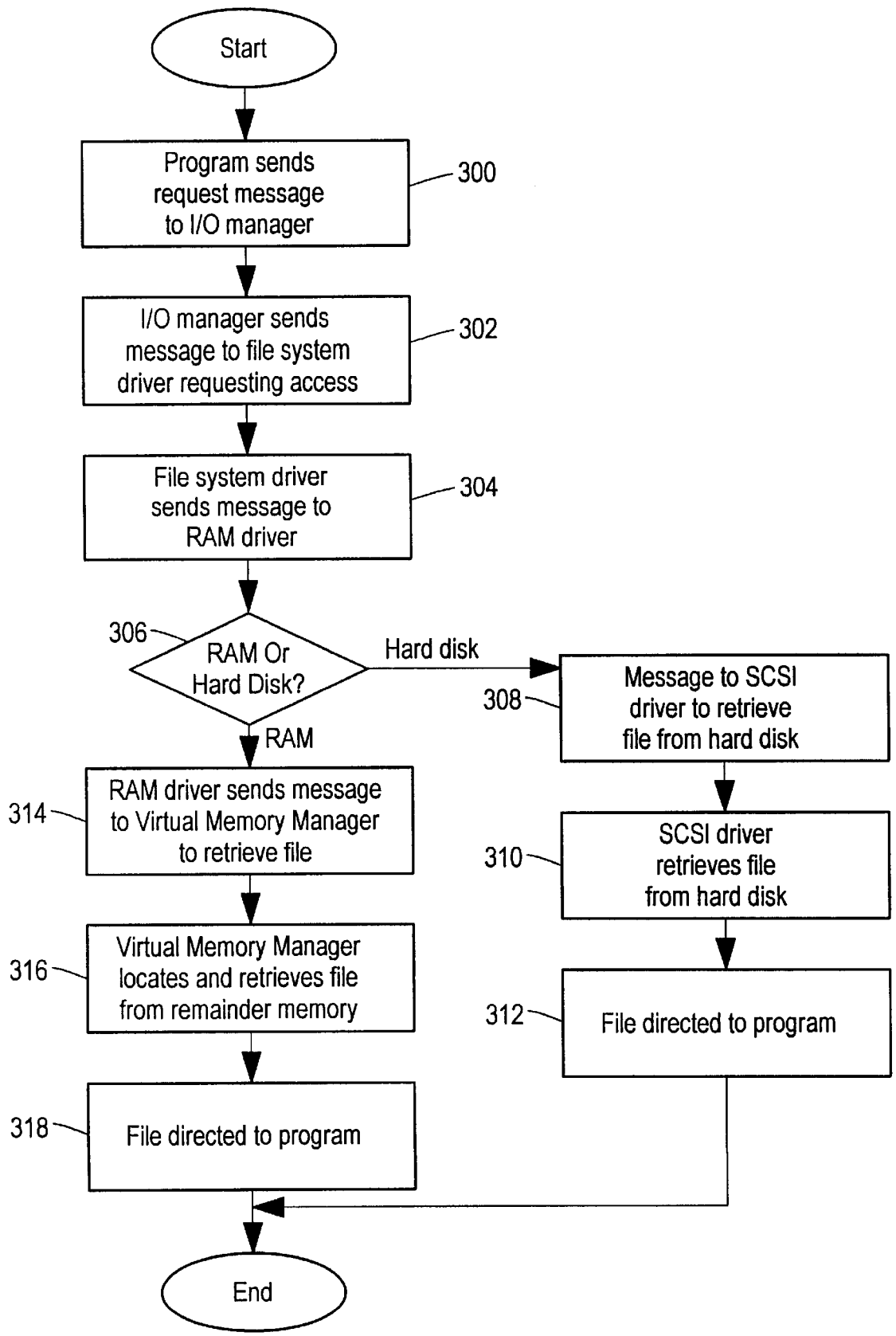
FIG. 3 shows a flow chart summarizing the preferred steps for retrieving a file from the remainder memory for use by an application program.

FIG. 3 shows a flow chart summarizing preferred steps for retrieving a designated file from the remainder memory for use by the application program 110. The process begins at step 300 in which the application program 110 transmits a request message to the I/O manager 114 requesting retrieval of the designated file. The message may include the name of the designated file. The I/O manager 114 responsively directs a message to the file system driver 124, which determines the start address of the file in the computer system 100 (step 302). If a preferred embodiment of the invention is used as a RAM disk, then the file is stored in the remainder memory. Alternatively, if a preferred embodiment of the invention is used as a disk cache, then the address may be in either the remainder memory, or in the hard disk 106. If used as a RAM disk, then the file system driver 124 transmits a message to the RAM driver 122 with the file start address (if in the RAM 104) and the name of the file (step 304). The file may be retrieved from the remainder memory in accordance with steps 314–318 as discussed below.

If a preferred embodiment of the invention is used as a disk cache, it then is determined at step 306 whether the file is in the RAM 104 or in the hard disk 106. If the address is in the hard disk 106, then the RAM driver 122 transmits a message to a SCSI driver (not shown) to retrieve the file from the hard disk 106 (step 308). The SCSI driver then locates the file, accesses the hard disk 106 via the HAL 116 to retrieve the file (step 310), and then directs the file to the application program 110 (step 312). The file may be retrieved from the hard disk 106 and directed to the application program 110 in accordance with conventional processes.

If the address is in the RAM 104 (i.e., in the remainder memory), then the process continues to step 314 in which the RAM driver 122 sends a message to the VMM 112 to retrieve the file from the remainder memory. This message may include the start address of the file in the remainder memory, and a call to the VMM 112 to retrieve the file from the RAM 104. The VMM 112 responsively accesses the remainder memory at that address, retrieves the file (step 316) and then directs the file to the program 110 via the file system driver 124 (step 318). In preferred embodiments, the memory access, file retrieval, and file directing are performed by a VMM function.

As suggested above, the invention may be implemented as a RAM disk, or as a disk cache. In either case, the RAM 104 may be utilized to temporarily store large volumes of data, thus enabling more files to be stored in the RAM 104.

In an alternative embodiment, the invention may be implemented as a computer program product for use with a computer system. Such implementation may include a series of computer instructions fixed either on a tangible medium, such as a computer readable media (e.g., a diskette, CD-ROM, ROM, or fixed disk), or transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable media with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

Having thus described the invention, what I desire to claim and secure by Letters Patent is:

1. A computer program product for accessing random access memory in a computer system running a virtual memory operating system, the computer system including a virtual memory manager for accessing the random access memory, the virtual memory manager having a nonpaged pool controller for accessing a nonpaged pool memory portion of the random access memory set aside by the operating system, the computer program product comprising a computer usable medium having computer readable program code thereon, the computer readable program code including:

program code for designating a part of the random access memory as system memory to be used by the operating system, when executed, the designating program code producing a remainder memory, the remainder memory being at least a portion of the random access memory not designated as system memory;

program code for receiving an access message to access the remainder memory; and program code for controlling the virtual memory manager, in response to receipt of the access message, to bypass the nonpaged pool controller and to directly access any part of the remainder memory.

2. The computer program product as defined by claim 1 wherein the remainder memory includes a plurality of locations, each location having an address, the program code for controlling including:

program code for directing an address message to the virtual memory manager, the address message having the address of a location in the remainder memory to access.

3. The computer program product as defined by claim 1 wherein the program code for controlling includes:

program code for reading a file stored in the remainder memory.

4. The computer program product as defined by claim 1 wherein the program code for controlling includes:

program code for creating a file in the remainder memory.

5. The computer program product as defined by claim 1 wherein the program code for controlling includes:

program code for writing to a file in the remainder memory.

6. The computer program product as defined by claim 1 wherein the remainder memory has a size that is greater than about 192 megabytes.

7. The computer program product as defined by claim 1 wherein the access message includes a request to access a file stored in the computer system, the program code for controlling including:

program code for determining if the file is stored in the remainder memory; and program code for accessing the file if it is determined that the file is stored in the remainder memory.

8. The computer program product as defined by claim 7 further including:

program code for retrieving data from the accessed file.

9. The computer program product as defined by claim 1 wherein the computer system includes non-volatile memory and the access message includes a request to access a file stored in the computer system, the program code for controlling including:

program code for determining if the file is stored in the non-volatile memory of the computer system; and program code for accessing the non-volatile memory if it is determined that the file is stored in the non-volatile memory.

10. The computer program product as defined by claim 1 further including:

program code for determining if the remainder memory has been produced.

11. A method of accessing random access memory in a computer system running a virtual memory operating system, the computer system including a virtual memory manager for accessing the random access memory, the virtual memory manager having a nonpaged pool controller for accessing a nonpaged pool memory portion of the random access memory set aside by the operating system, the method comprising the steps of:

designating a part of the random access memory as system memory to be used by the operating system, the step of designating producing a remainder memory, the remainder memory being at least a portion of the random access memory not designated as system memory;

receiving an access message to access the remainder memory; and controlling the virtual memory manager, after the access message is received, to bypass the nonpaged pool controller and to directly access any part of the remainder memory.

12. The method as defined by claim 11 wherein the remainder memory includes a plurality of locations, each location having an address, the step of controlling including the step of:

directing an address message to the virtual memory manager, the address message having the address of a location in the remainder memory to access.

13. The method as defined by claim 11 wherein the step of controlling includes the step of:

reading a file stored in the remainder memory.

14. The method as defined by claim 11 wherein the step of controlling includes the step of:

creating a file in the remainder memory.

15. The method as defined by claim 11 wherein the step of controlling includes the step of:

writing to a file in the remainder memory.

16. The method as defined by claim 11 wherein the remainder memory has a size that is greater than about 192 megabytes.

17. The method as defined by claim 11 wherein the access message includes a request to access a file stored in the computer system, the step of controlling including the steps of:

determining if the file is stored in the remainder memory; and accessing the file if it is determined that the file is stored in the remainder memory.

18. The method as defined by claim 17 further including the step of:

retrieving data from the accessed file.

19. The method as defined by claim 11 wherein the computer system includes non-volatile memory and the access message includes a request to access a file stored in the computer system, the step of controlling including the steps of:

determining if the file is stored in the non-volatile memory of the computer system; and accessing the non-volatile memory if it is determined that the file is stored in the non-volatile memory.

20. The method as defined by claim 11 further including the step of:

determining if the remainder memory has been produced.

21. An apparatus for accessing random access memory in a computer system running a virtual memory operating system, the computer system including a virtual memory manager for accessing the random access memory, the virtual memory manager having a nonpaged pool controller for accessing a nonpaged pool memory portion of the random access memory set aside by the operating system, the apparatus including:

means for designating a part of the random access memory as system memory to be used by the operating system, the means for designating producing a remainder memory, the remainder memory being at least a portion of the random access memory not designated as system memory;

means for receiving an access message to access the remainder memory; and means for controlling the virtual memory manager, after the access message is received, to bypass the nonpaged pool controller and to directly access any part of the remainder memory.

22. The apparatus as defined by claim 21 wherein the remainder memory includes a plurality of locations, each location having an address, the means for controlling including:

means for directing an address message to the virtual memory manager, the address message having the address of a location in the remainder memory to access.

23. The apparatus as defined by claim 21 wherein the means for controlling includes:

means for reading a file stored in the remainder memory.

24. The apparatus as defined by claim 21 wherein the means for controlling includes:

means for creating a file in the remainder memory.

25. The apparatus as defined by claim 21 wherein the means for controlling includes:

means for writing to a file in the remainder memory.

26. The apparatus as defined by claim 21 wherein the remainder memory has a size that is greater than about 192 megabytes.

27. The apparatus as defined by claim 21 wherein the access message includes a request to access a file stored in the computer system, the means for controlling including:

means for determining if the file is stored in the remainder memory; and means for accessing the file if it is determined that the file is stored in the remainder memory.

28. The apparatus as defined by claim 27 further including:

means for retrieving data from the accessed file.

29. The apparatus as defined by claim 21 wherein the computer system includes non-volatile memory and the access message includes a request to access a file stored in the computer system, the means for controlling including:

means for determining if the file is stored in the non-volatile memory of the computer system; and means for accessing the non-volatile memory if it is determined that the file is stored in the non-volatile memory.

30. The apparatus as defined by claim 21 further including:

means for determining if the remainder memory has been produced.

31. The apparatus as defined by claim 21 wherein data is not paged from the remainder memory.

32. A method of partitioning random access memory in a computer system executing a virtual memory operating system, the virtual memory operating system having a non-paged pool controller that controls access to a non-paged pool portion of the random access memory, the method comprising:

designating a first portion of the random access memory to be utilized for storing operating system data;

designating a second portion of the random access memory to be utilized for storing nonoperating system data, the second portion being a remainder memory; and controlling the operating system to bypass the non-paged pool controller when accessing the remainder memory.

33. The method as defined by claim 32 wherein the first portion and second portion are different physical portions of the random access memory.

34. The method as defined by claim 32 wherein the operating system is deemed to access the remainder memory when retrieving data from the remainder memory.

35. The method as defined by claim 32 wherein the operating system is deemed to access the remainder memory when storing data in the remainder memory.

36. A computer program product for partitioning random access memory in a computer system executing a virtual memory operating system, the virtual memory operating system having a non-paged pool controller that controls access to a non-paged pool portion of the random access memory, the computer program product comprising a computer usable medium having computer readable program code thereon, the computer readable program code including:

program code for designating a first portion of the random access memory to be utilized for storing operating system data;

program code for designating a second portion of the random access memory to be utilized for storing non-operating system data, the second portion being a remainder memory; and program code for controlling the operating system to bypass the non-paged pool controller when accessing the remainder memory.

37. The computer program product as defined by claim 36 wherein the operating system is deemed to access the remainder memory when either retrieving data from the remainder memory, or when storing data in the remainder memory.

38. An apparatus for accessing random access memory in a computer system having a virtual memory operating system, the virtual memory operating system having a non-paged pool controller for accessing the random access memory, the apparatus comprising:

a configuration manager that partitions the random access memory into a system memory and a remainder memory, the system memory storing operating system data, the remainder memory storing non-operating system data; and a memory driver that receives an access request to access the random access memory, the memory driver providing access to either one of the remainder memory and the system memory in response to the request, the memory driver bypassing the nonpaged pool controller to access the remainder memory.

39. The apparatus as defined by claim 38 wherein the operating system includes a virtual memory manager for controlling access to the random access memory, the memory driver including an output that forwards a bypass message to the virtual memory manager in response to receipt of the access request, the bypass request controlling the virtual memory manager to bypass the non-paged pool controller when accessing the remainder memory.

* * * * *